Nov. 9, 1954     R. L. STEVEN     2,693,793
PRESSURE COOKER

Filed Aug. 6, 1951     2 Sheets-Sheet 1

INVENTOR.
Ray L. Steven.
BY
C. Lauren Mabry
ATTORNEY.

Nov. 9, 1954    R. L. STEVEN    2,693,793
PRESSURE COOKER
Filed Aug. 6, 1951    2 Sheets-Sheet 2
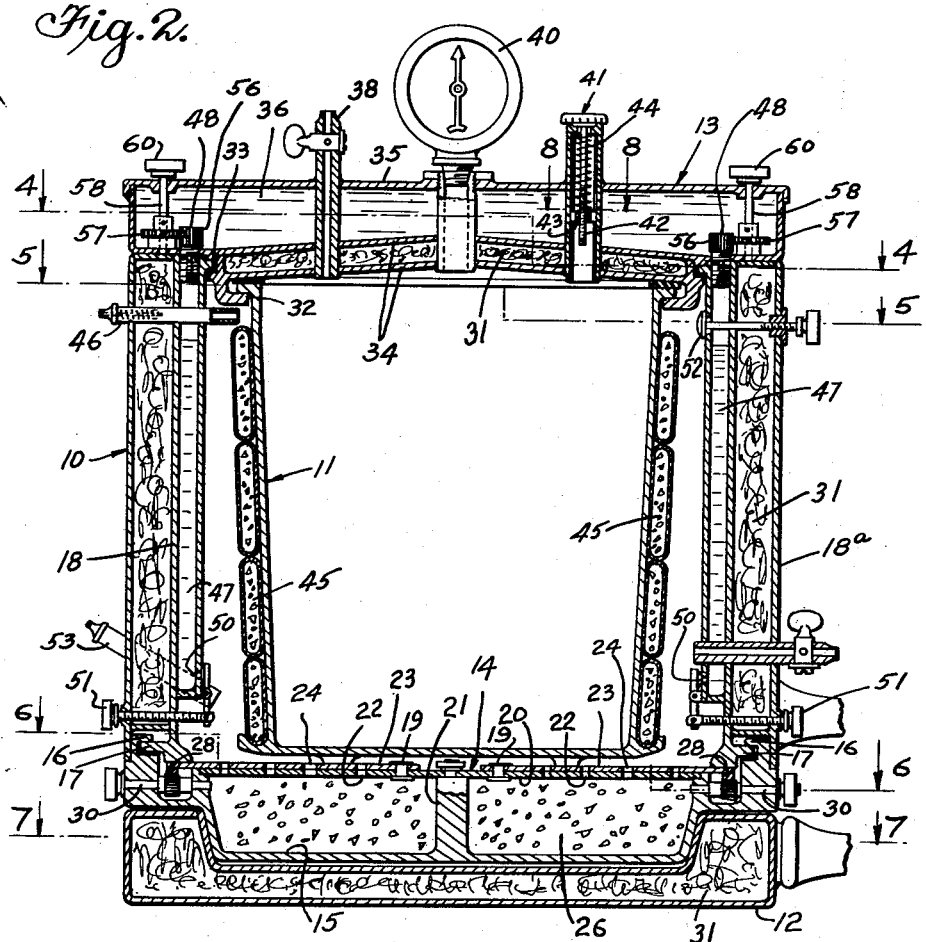
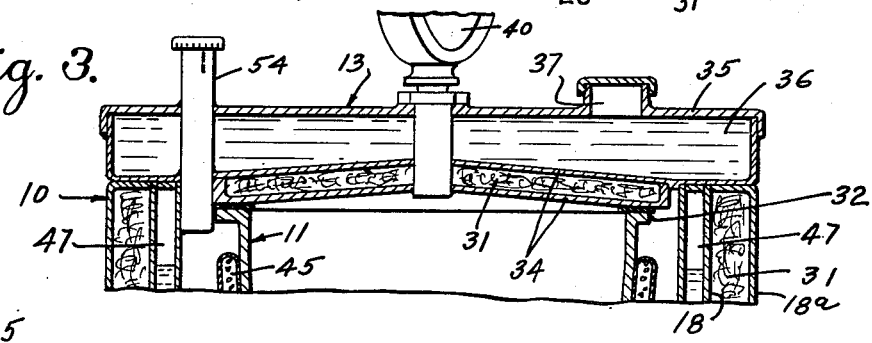
INVENTOR.
Ray L. Steven.
C. Lauren Maltby
ATTORNEY.

United States Patent Office 2,693,793
Patented Nov. 9, 1954

2,693,793

PRESSURE COOKER

Ray L. Steven, Los Angeles, Calif.

Application August 6, 1951, Serial No. 240,509

2 Claims. (Cl. 126—263)

This invention relates to heating apparatus and more especially to a pressure cooker having self-contained heating means.

An object of the invention is to provide novel improvements in a pressure cooker having self-contained heating means.

Another object of the invention is to provide a pressure cooker of novel construction adapted to be self heating by the use of chemical materials which become exothermic when water is added thereto.

An additional object of the invention is to provide a novel pressure cooker of the character described having adjustable control means by which varying degrees of heat may be generated in the unit.

Other objects and advantages will appear and be brought out more fully in the following specification, reference being had to the accompanying drawing.

In the drawing:

Figure 2 is an enlarged elevation view in section taken along the line 2—2 of Figure 1.

Figure 3 is a partial sectional view taken along the line 3—3 of Figure 1.

Figure 10 is a fragmentary view of one of the heating elements.

Figure 1:
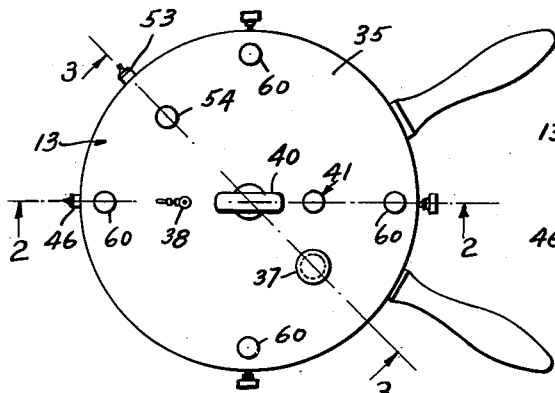
Figure 1 is a top plan view of a pressure cooker embodying the invention.
Figure 4:
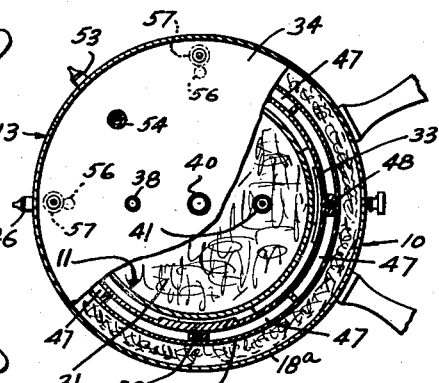
Figure 4 is a sectional view taken along the line 4—4 of Figure 2.
Figure 5:
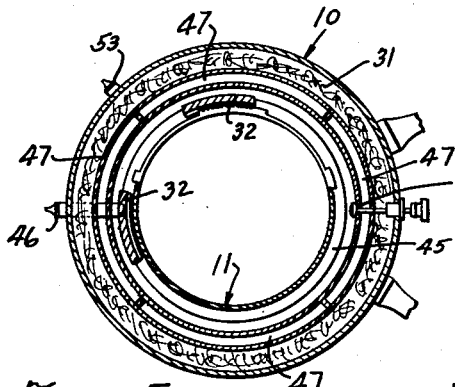
Figure 5 is a sectional view taken along the line 5—5 of Figure 2.
Figure 6:
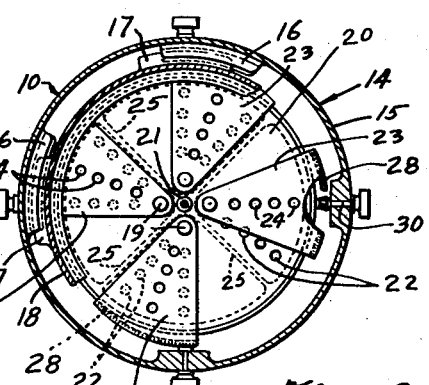
Figure 6 is a sectional view taken along the line 6—6 of Figure 2.
Figures 7, 9:
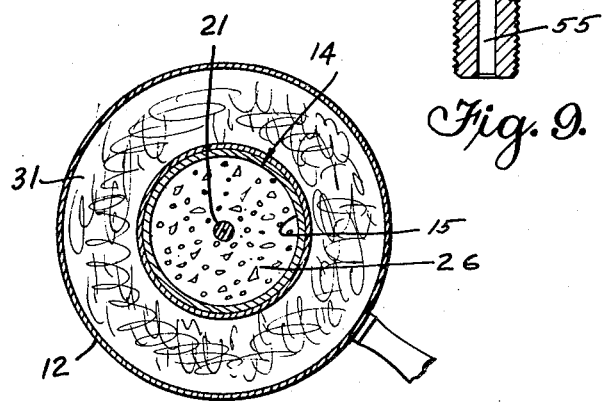
Figure 7 is a sectional view taken along the line 7—7 of Figure 2.
Figure 9 is an enlarged view in section showing one of the water control valves.
Figure 8:
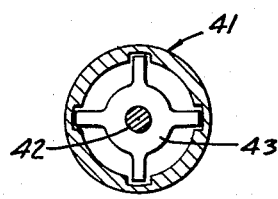
Figure 8 is an enlarged sectional view taken along the line 8—8 of Figure 2.

Referring more particularly to the drawing, the numeral 10 indicates generally a pressure cooker shell assembly in which is positioned a cooking vessel 11, the assembly being positionable on a base 12 and having a cover chamber 13 for the assembly and the vessel. A heating unit 14 comprises the bottom of the shell assembly 10 and consists of a pan 15 detachably secured to the shell assembly 10 by a plurality of flanges 16 engageable with flanges 17 formed in the lower portion of the inner wall 18 of shell 10, the shell having an outer wall 18A. A pan 15 has a top plate 20 secured to the top of a center post 21 and has a plurality of apertures 22 disposed in radial arrangement as shown in Figure 6. A plurality of sector plates 23 are suitably pivoted at 19 to plate 20 and have rows of apertures 24 which may be alined with apertures 22 as will be brought out more fully hereinafter. The pan 15 has a plurality of walls 25, four in number, arranged radially forming compartments or trays in which is positioned a chemical 26, such as lime, which becomes exothermic when water is added thereto. Sectors 23 each have a rack 28 engageable with the pinion on a shaft 30 which is actuatable by a knob which is positioned externally of the pan by which each sector plate may be shiftable to aline apertures 24 with apertures 22 for permitting the water to enter the trays 26. A space between walls 18 and 18A is preferably filled with a heat insulating material, such as asbestos or any equivalent material.

Cooking vessel 11 is detachably secured to cover chamber 13 by a split rotatable cam frame engagement 32 of conventional type and the chamber is similarly connected to shell 10 by flange connection 33. Cover chamber 13 includes a pair of top plates 34 between which is positioned a heat insulating material such as 31. The cover chamber includes a top plate 35 providing a water chamber 36 and is formed with a filling neck 37 suitably provided with a cap or plug.

A pipe 38 having a control valve extends through the cover chamber 13 and gauge 40 is similarly constructed and arranged. An adjustable regulating valve unit 41 also extends through cover chamber 13 and includes a valve stem 42 having a threaded portion on which is secured a spider 43 which seats a spring 44 which engages an internal flange at the top of the valve unit whereby the pressure inside of vessel 11 may be released at any selected pressure.

Vessel 11 is heated by a plurality of strips 45 bent into a circle each of which consists of a pleated paper walled element containing an exothermic chemical material or may comprise heating units of the type disclosed in my co-pending application Serial No. 692,625, now Patent No. 2,533,878. A filling tube 46 extends through shell 10 and provides means by which water may be introduced into jacket strips 45.

A plurality of water tubes 47 are formed internally on shell 10 and each is provided with an inlet valve 48 for controlling the flow of water from chamber 36 into the tubes. Each tube 47 is provided with an outlet valve 50 having an operating knob 51 externally of the shell and a pressure release valve 52 is provided for each tube 47. An auxiliary water inlet 53 comprises a tube extending through shell 10 at the lower part of the shell to permit water to be dropped directly on pan 15. A pressure release valve 54 similar to valve 41 is positioned as shown in Figure 3 to control the pressure in shell 10 and externally of vessel 11. Valves 48 are each formed with a passage 55 and a gear tooth formation 56 actuatable by a gear 57 mounted on stem 58 which extends through the top of cover chamber 13 and has an operating knob 60.

While in the foregoing there has been shown and described the preferred form of this invention, it is to be understood that minor changes in the details of construction, combination and arrangement of parts may be resorted to without departing from the spirit and scope of the invention as claimed.

I claim:

1. A structure as described comprising in combination a cylindrical shell, adapted to enclose a cooking vessel, a base detachably secured to the shell adapted to contain a composition adapted to react exothermically when water is added thereto, a cover and water chamber replaceably secured to said shell, said shell having valved passageways for conducting water from said water chamber to said base, said base having a top plate formed with water inlet ports and means to selectively open and close a selected plurality of said ports, said means including shiftable apertured sector plates and means extending outside of said base to shift said plates to align the apertures thereof with said top plate ports.

2. A structure as described comprising in combination a cylindrical shell, adapted to enclose a cooking vessel, a base detachably secured to the shell adapted to contain a composition adapted to react exothermically when water is added thereto, a cover having a water chamber for said shell, said shell having valved passageways for conducting water from said water chamber to said base, said cover and water chamber having a valve for each passageway, said base having a top plate formed with water inlet ports, a plurality of apertured sector plates pivotally mounted on said top plate, each sector plate having a peripherally disposed rack and means to shift said sector plates to selectively open and close a selected plurality of said ports, to effect a controlled dispersion of the water over the exothermic material, said means including a pinion mounted on said base for each rack and manually actuatable means to rotate said pinions said cover having an adjustable pressure relief valve.

References Cited in the file of this patent

UNITED STATES PATENTS

| Number | Name | Date |
|---|---|---|
| 14,340 | Albro | Mar. 4, 1856 |
| 818,092 | Jewett | Apr. 17, 1906 |
| 1,164,845 | Murphy | Dec. 21, 1915 |
| 1,971,364 | Zimmer et al. | Aug. 28, 1934 |
| 2,202,320 | Sacerdote | May 28, 1940 |
| 2,300,793 | Martin | Nov. 3, 1942 |

FOREIGN PATENTS

| Number | Country | Date |
|---|---|---|
| 5,824 | Great Britain | of 1908 |
| 407,332 | France | Dec. 27, 1909 |
| 329,082 | Germany | Nov. 15, 1920 |
| 747,004 | France | Mar. 21, 1933 |
| 452,542 | Great Britain | Aug. 25, 1936 |